(12) United States Patent
Kato

(10) Patent No.: US 7,490,338 B2
(45) Date of Patent: Feb. 10, 2009

(54) DISC DEVICE

(75) Inventor: Yasuhiro Kato, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 437 days.

(21) Appl. No.: 11/363,096

(22) Filed: Feb. 28, 2006

(65) Prior Publication Data

US 2006/0218567 A1    Sep. 28, 2006

(30) Foreign Application Priority Data

Mar. 25, 2005    (JP)    ............................ 2005-087746

(51) Int. Cl.
*G11B 33/02*    (2006.01)
(52) U.S. Cl. .................................................. 720/647
(58) Field of Classification Search .................. 720/647
See application file for complete search history.

(56) References Cited

U.S. PATENT DOCUMENTS 4,530,081 A * 7/1985 Sakurai et al. .............. 720/647
5,065,004 A * 11/1991 Mizuno et al. .............. 235/479
6,101,160 A * 8/2000 Busch et al. ................ 720/647

FOREIGN PATENT DOCUMENTS

| JP | UM-A-3-128178 | 12/1991 |
|---|---|---|
| JP | A-5-234346 | 9/1993 |
| JP | UM-A-6-11143 | 2/1994 |
| JP | A-10-320882 | 12/1998 |
| JP | A-2001-052403 | 2/2001 |

* cited by examiner

*Primary Examiner*—Allen T Cao
(74) *Attorney, Agent, or Firm*—Morgan, Lewis & Bockius LLP

(57) ABSTRACT

A disc device includes a cabinet having a tray ejection/inserting opening; a disc tray being ejected from and inserted into the tray ejecting/inserting opening of the cabinet; a tray cover being capable of opening and closing the tray ejecting/inserting opening of the cabinet; and an engaging unit that engages the disc tray with the tray cover at an opening position when the disc tray is inserted to thereby pull in and close the tray cover from the opening position. The tray cover is pushed out and opened from a closing position by the disc tray when the disc tray is ejected. The engaging unit holds the disc tray and the tray cover engaged with each other when the disc tray is received in the cabinet to thereby prevent the tray cover from being opened.

5 Claims, 4 Drawing Sheets

DISC DEVICE

CROSS-REFERENCE TO RELATED APPLICATION

This application is based on and claims the benefit of priority from the prior Japanese Patent Application No. 2005-087746, filed on Mar. 25, 2005; the entire contents of which are incorporated herein by reference.

BACKGROUND

1. Field of the Invention

The present invention relates to a disc device, in particular, a disk device capable of locking a tray cover, which is mounted on the tray ejecting/inserting opening of a cabinet in such a way as to be opened and closed, when the tray cover is closed.

2. Description of the Related Art

There has been conventionally proposed a structure of a tray door of a disc player provided with a function that when a tray is received in a main body, an engaging part fixed to the tray door is engaged with a protrusion fixed to a tray to prevent the tray door from being manually opened (refer to, for example, JP-UM-A-6-11143). Then, in a disc player described in JP-UM-A-6-11143, the action of opening and closing the tray door is braked by a gear mechanism. Hence, it is thought that when the tray is ejected from the inside of the main body to the outside of the main body, the tray door is opened by the action of the gear mechanism, which precedes the ejection of the tray, and that the tray is closed by the action of the gear mechanism after the tray is inserted into the main body from the outside of the main body.

Meanwhile, a disc device such as DVD includes: a disc tray inserted and ejected between the inside and the outside of a tray ejecting/inserting opening of a cabinet; a tray cover capable of opening and closing the tray ejecting/inserting opening and pushed out from a closing position and opened by the disc tray when the disc tray is ejected; and a spring part for pressing the tray cover onto the edge of the tray ejecting/inserting opening to keep the tray cover in a closing position (comparative example).

SUMMARY

However, in the comparative example, there is a possibility that when the disc tray is received in the cabinet, the tray cover closing the tray ejecting/inserting opening by the biasing force of the spring part is manually opened. For this reason, in a disc device having a tray ejecting/inserting opening formed in the front panel of a cabinet and opened in the front of the cabinet, there is a possibility that an infant or the like accidentally opens the tray cover closing the tray ejecting/inserting opening and puts in a foreign matter. Then, when such an act is performed, there are raised the following possibilities: that is, a disc placed on the disc tray is damaged; a short circuit is developed in electric paths; and in some case, a foreign matter inserted from the tray ejecting/inserting opening is held left in the cabinet to cause various troubles.

The tray cover closing the ejecting/inserting opening is accidentally opened. It can be prevented by taking the above-mentioned measures proposed in the JP-UM-A-6-11143. However, in the device having such measures taken, as is evident from JP-UM-A-6-11143, the device is additionally provided with a gear mechanism for inserting and retracting the disc tray. This makes a mechanism relating to the opening and closing of the disc tray more complex and causes cost increase.

The present invention has been made under the above-mentioned circumstances and provides a disc device capable of preventing a tray cover for opening and closing a tray ejecting/inserting opening from being accidentally opened when a disc tray is received in a cabinet. The disc device can eliminate a gear mechanism for opening and closing the tray cover by mechanically connecting an operation of opening and closing the tray cover to an operation of inserting and ejecting the disc tray.

The disc device can eliminate a spring part for pressing a tray cover onto the edge of a tray ejecting/inserting opening to keep the tray cover in a closing position by mechanically connecting the operation of closing the tray cover to the operation of inserting the disc tray.

According to an aspect of the invention, a disc device is provided with a disc tray that is ejected from and inserted into a tray ejecting/inserting opening of a cabinet and a tray cover that can open and close the tray ejecting/inserting opening and is pushed out and opened from a closing position by the disc tray when the disc tray is ejected. Then, the disc device is provided with an engaging unit that engages the disc tray with the tray cover at a closing position when the disc tray is inserted to thereby pull in and close the tray cover from an opening position and holds the disc tray and the tray cover engaged with each other when the disc tray is received in the cabinet to thereby prevent the tray cover from being opened.

According to another aspect of the invention, a disc device is further embodied by adopting a construction in which in a disc device of the type including a disc tray that is ejected from and inserted into a tray ejecting/inserting opening of a cabinet and a tray cover that can open and close the tray ejecting/inserting opening and is pushed out and opened from a closing position by the disc tray when the disc tray is ejected, the above-mentioned tray cover is mounted in such a way as to be opened and closed around a lateral shaft at a bottom portion of the tray ejecting/inserting opening formed in a front of the cabinet and has engaging unit, which engages the disc tray with the tray cover at an opening position when the disc tray is inserted to thereby pull in and close the tray cover from the opening position and holds the disc tray and the tray cover engaged with each other when the disc tray is received in the cabinet to thereby prevent the tray cover from being opened, provided at two symmetric positions on left and right sides across a center position in a direction of width of the tray cover. In the above-mentioned construction, each of the above-mentioned engaging unit is constructed of a protrusion that is formed on the disc tray and a hook that is formed on the tray cover and is engaged with the protrusion when the disc tray is received in the cabinet to thereby prevent the tray cover from being opened, and is separated from the protrusion when the disc tray is ejected to thereby be standby at a position where the hook is engaged with the protrusion when the disc tray is inserted.

BRIEF DESCRIPTION OF THE DRAWINGS

These and other objects and advantages of this invention will become more fully apparent from the following detailed description taken with the accompanying drawings in which.

DESCRIPTION OF THE EMBODIMENTS

Figure 1:
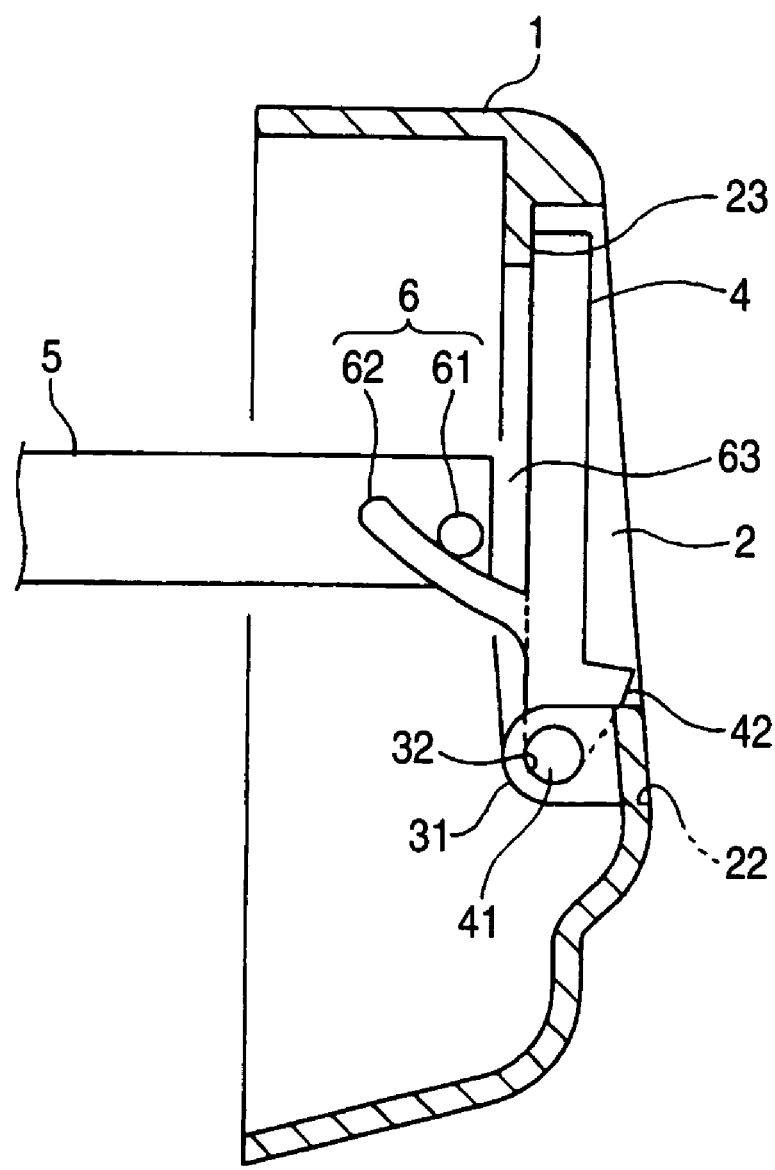
FIG. 1 is a longitudinal side view of a main portion showing a state where a tray cover of a disc device closes a tray ejecting/inserting opening.
Figure 2:
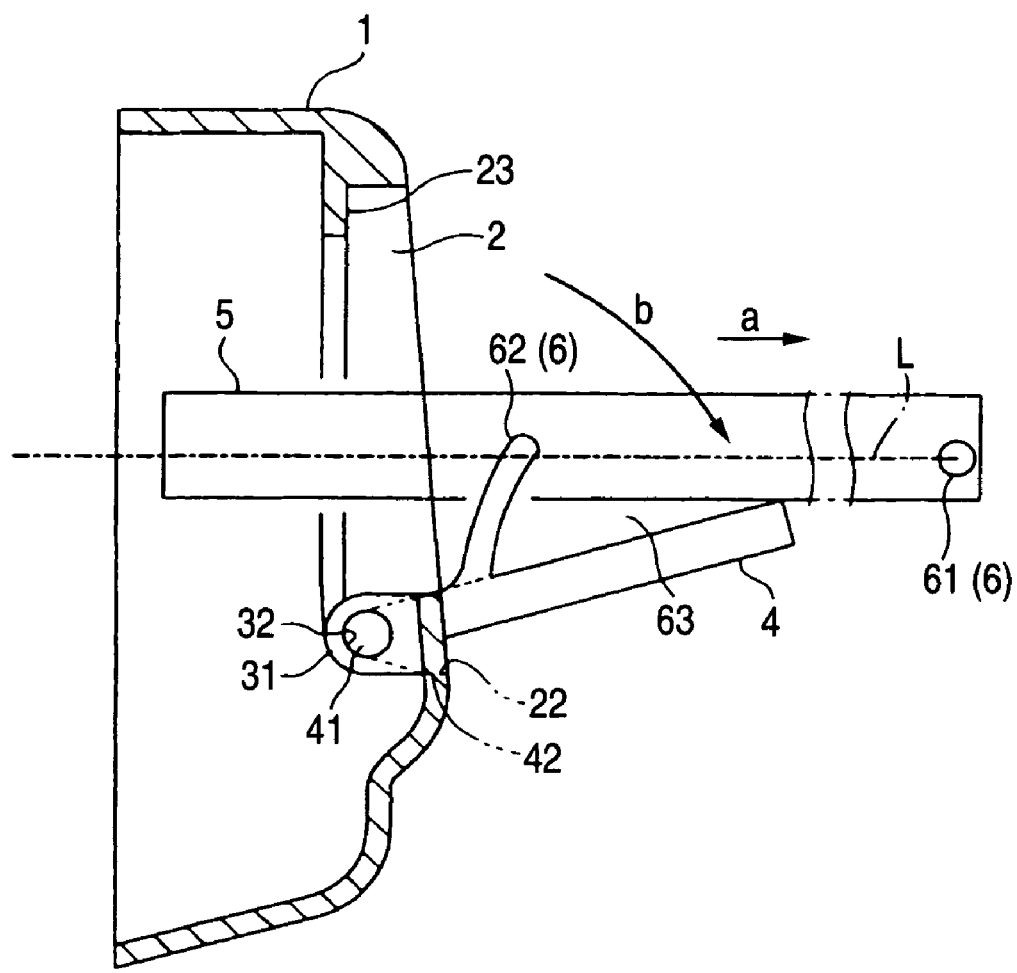
FIG. 2 is a longitudinal side view, partially omitted, of a main portion showing a state where a disc tray of the disc device is ejected from the tray inserting/closing opening.
Figure 3:
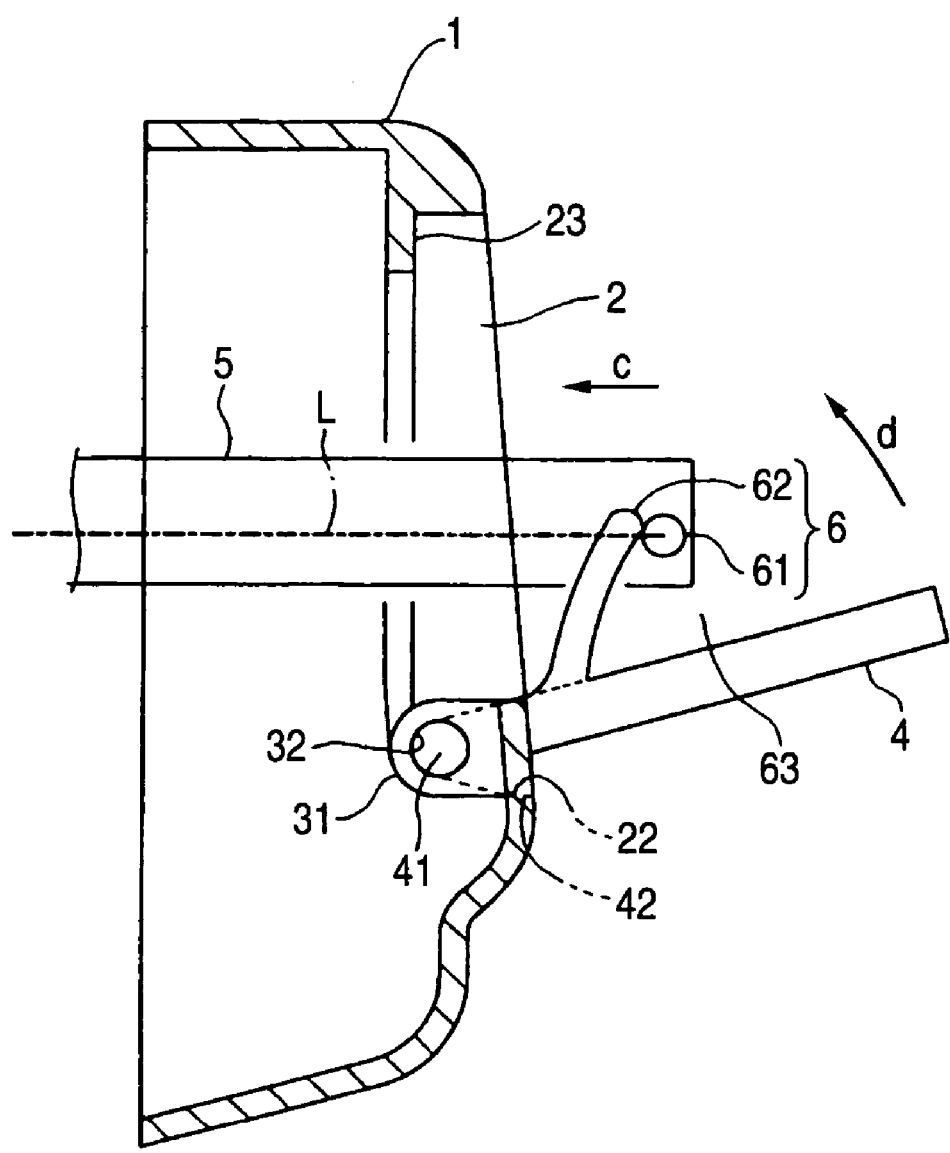
FIG. 3 is a longitudinal side view, partially omitted, of a main portion showing a state where the disc tray of the disc device is inserted.
Figure 4:
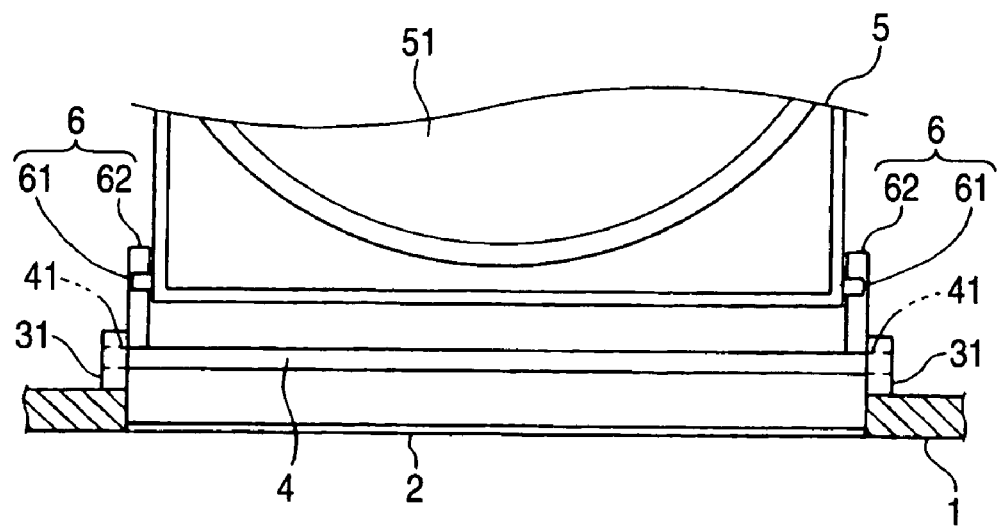
FIG. 4 is a lateral plan view of a main portion of the disc device.

FIG. 1 is a longitudinal side view of a main portion showing a state where a tray cover 4 of a disc device closes a tray ejecting/inserting opening 2. FIG. 2 is a longitudinal side view, partially omitted, of a main portion showing a state where a disc tray 5 of the disc device is ejected from the tray inserting/closing opening 2. FIG. 3 is a longitudinal side view, partially omitted, of a main portion showing a state where the disc tray 5 of the disc device is inserted. Then, FIG. 4 is a lateral plan view of a main portion of the disc device.

In FIG. 1 to FIG. 4, a reference numeral 1 denotes a front panel of a cabinet. The front panel 1 has a laterally elongated tray ejecting/inserting opening 2 formed in its front and has two bearing brackets 31, 31, each of which is molded integrally with each of two left and right portions of the front panel 1, arranged on both left and right sides of the tray ejecting/inserting opening 2. Then, lateral shafts 41, 41, each of which is molded integrally and coaxially with each of the left and right bottom ends of a tray cover 4 formed in a laterally elongated shape, are rotatably fitted in the bearing bores 32, 32 of the bearing brackets 31, 31, respectively. Then, the tray cover 4 can be moved around portions where these lateral shafts 41, 41 are fitted in the bearing bores 32, 32, thereby being opened and closed between such a closing position (standing position) to close the tray ejecting/inserting opening 2 that is shown in FIG. 1 and such an opening position (tilting position) to open the tray ejecting/inserting opening 2 that is shown in FIG. 2. Then, the tray cover 4 and the edge of the tray ejecting/inserting opening 2 have abutting surfaces 42, 22 formed thereon. When the tray cover 4 is pressed down by a disc tray 5, the abutting surface 42 of the tray cover 4 abuts against the abutting surface 22 of the tray ejecting/inserting opening 2 to hold the tray cover at the opening position. In addition, on the edge of the tray ejecting/inserting opening 2 is formed an abutting surface 23 which has the outside edge portion of the tray cover 4 abutted thereon to hold the tray cover 4 at the closing position when the tray cover 4 is erected.

The disc 5 is formed in a nearly rectangular shape and has a disc holding space 51 on its top surface side and is inserted into and ejected from the tray ejecting/inserting opening 2 by the action of a tray controlling mechanism (not shown). Then, when the disc tray 5 is received in the cabinet and is positioned by a mechanism (not shown), processing for recording and reproducing is performed to a disc, and when the disc tray 5 is ejected to the outside of the tray ejecting/inserting opening 2, the operations of removing and putting a disc from and in the disc holding space 51 is performed.

This disc device is provided with an engaging unit 6 for mechanically engaging the operation of the disc tray 5 with the operation of the tray cover 4. When the disc tray 5 is inserted, the action of this engaging unit 6 engages the disc tray 5 with the tray cover 4 at the opening position to pull in the tray cover 4 from the opening position to thereby close the tray cover 4, whereas when the disc tray 5 is received in the cabinet, the action of this engaging unit 6 holds the-disc tray 5 and the tray cover 4 engaged with each other to prevent the tray cover 4 from being opened.

The engaging unit 6 shown in the drawing is constructed of protrusions 61 formed on the disc tray 5 and hooks 62 formed on the tray cover 4, and each of the hooks 62 is formed in a shape such that when the disc tray 5 is received in the cabinet as shown in FIG. 1, the hook 62 is engaged with the protrusion 61 to prevent the tray cover 4 from being opened and such that the disc tray 5 is ejected, the hook 62 is disengaged from the protrusion 61 as shown in FIG. 2 and is standby at a position where the hook 62 engaged with the disc tray 5 when it is inserted. Describing the engaging unit 6 shown in the drawing further specifically, the protrusion 61 is formed on the side of the top of the disc tray 5 in a position protruding in a lateral direction, whereas the hook 62 is extended along the tray cover 4 from its bottom surface near a portion close to the bottom of the tray cover 4 and has an opposed space 63 forming an opening, through which the protrusion 61 is put in and pulled out, between the top of the hook 62 and the bottom surface of the tray cover 4. In addition, the hook 62 has a length protruding on the side of the disc tray 5 over a path L, along which the protrusion 61 is moved when the disc tray 5 is inserted, when the disc tray 5 is ejected as shown in FIG. 2 and the tray cover 4 is thereby brought to the opening position. Moreover, in this example shown in the drawing, as shown in FIG. 4, the engaging unit 6 having the above-mentioned construction are formed on two symmetric positions on the left and right sides across the center position in the direction of width of the tray cover 4.

According to the disc device constructed in the manner described above, as shown in FIG. 1, when the disc tray 5 is inserted into the tray ejecting/inserting opening 2 and is received in the cabinet, the protrusions 61 are engaged with the hooks 62, respectively, and hence the tray cover 4 is held at the closing position in association with the action of the abutting surface 23 of the edge of the tray ejecting/inserting opening 2 to close the tray ejecting/inserting opening 2. Further, even if the tray cover 4 is pulled outward by human power, the protrusions 61 engaged with the hooks prevent the tray cover 4 from being opened and hence the tray cover 4 is not opened, that is, is held locked. In particular, in this embodiment, the engaging unit 6 are provided at two symmetric positions on the left and right sides across the center position in the direction of width of the tray cover 4, and hence there is offered an advantage that even if only one side of the tray cover 4 is pulled outward, the tray cover 4 is prevented from being twisted or warped. Then, when the tray cover 4 is locked at the closing position, there is not caused a trouble that the tray cover 4 is opened by human power to allow a foreign matter to be inserted. With this, it is possible to prevent a trouble that a foreign matter is held left in the cabinet, a trouble that even when a disc is placed in the disc placing space 51 of the disc tray 5, the disc is damaged by a foreign matter, and a trouble that the foreign matter develops a short circuit in the electric paths of a wiring board or the like arranged in the cabinet.

When the disc tray 5 received in the cabinet is ejected to the outside of the tray ejecting/inserting opening 2 as shown by arrow (a) in FIG. 2 by the action of the tray controlling mechanism, the disc tray 5 hits the tray cover 4 to push out the tray cover 4 in an early stage and hence the tray cover 4 is pushed out and opened by the disc tray 5 with the fitting portions of the lateral shafts 41 and the bearing bores 32 as fulcrums. Then, when the protrusions 61 are removed from the above-mentioned opposed space 63 along with the ejecting motion of the disc tray 5, the protrusions 61 are separated from the hooks 62 and hence the tray cover 4 is pushed down as shown by arrow (b) to cause the abutting surface 42 to abut against the abutting surface 22 of the tray ejecting/inserting opening 2 as shown in FIG. 2, thereby keeping the opening position and at the same time retracting in a dead space formed below the disc tray 5.

When the disc tray 5 ejected to the outside of the tray ejecting/inserting opening 2 is inserted and retracted into the tray ejecting/inserting opening 2 as shown by arrow (c) in FIG. 3 by the action of the tray controlling mechanism, the protrusions 61 are moved gradually closer to the hooks 62, which protrude into the moving paths L of the protrusions 61 and are standby there, and then are engaged with the hooks 62 as shown in FIG. 3. Hence, in a state where the successive insertion of the disc tray 5 engages the protrusions 61 with the hooks 62 to pull in and close the tray cover 4 as shown by arrow (d) to thereby completely receive the disc tray 5 in the cabinet as shown in FIG. 1, the protrusions 61 are held engaged with the hooks 62 and the tray cover 4 is held closed.

This embodiment is constructed in such a way that, in particular, the tray ejecting/inserting-opening 2 is formed in the front of the cabinet and that the tray cover 4 for opening and closing the tray ejecting/inserting opening 2 in the front of the cabinet is locked at the closing position. Hence, this construction can prevent a trouble that the tray cover 4 is opened by mischief done by an infant or the like and hence can improve safety. Moreover, the disc tray 5 and the tray cover 4 are mechanically connected to each other in such a way that the tray cover 4 is opened and closed in operative connection to the insertion and ejection of the disc tray 5. Hence, it is not necessary to hold the tray cover at the closing position by the use of a spring part and to provide a gear mechanism for opening and closing the tray cover.

In this embodiment, when the disc tray 5 is inserted into the tray ejecting/inserting opening 2 and is received in the cabinet, the protrusions 61 of the engaging unit 6 are engaged with the hooks 62 to hold the tray cover 4 at the closing position on the abutting surface 23 formed at the edge of the tray ejecting/inserting opening 2. In this case, when a construction is employed in which the hooks 62 are endowed with elasticity and are deformed against its elasticity by the protrusions 61 engaged with the hooks 62 to put the tray cover 4 into elastic contact with the abutting surface 23 at the edge of the tray ejecting/inserting opening 2, there is provided an advantage that the tray cover 4 is put into steady contact with the abutting surface 23 to close the tray ejecting/inserting opening 2 with reliability.

In the above-embodiment, a protrusion 61 of the engaging unit 6 is formed on both sides of the disk tray. However, for example, a groove portion may be provided with the lower portion of the disk tray. The protrusion 61 maybe formed into the groove portion and a hook provided with the tray cover 4 may be engaged with the protrusion 61.

According to the above-embodiments, when the disc tray received in the cabinet is ejected from the tray ejecting/inserting opening, the tray cover is pushed out and opened from the closing position by the disc tray, and conversely, when the tray cover ejected from the tray ejecting/inserting opening is inserted into the cabinet, the engaging unit engages the tray cover with the disc tray whereby the tray cover is pulled in and closed from the opening position by the disc tray. Then, when the disc tray is received in the cabinet, the disc tray and the tray cover are held engaged with each other by the engaging unit, whereby the tray cover is prevented from being opened. Hence, this can prevent a trouble that the tray cover is accidentally opened. In this manner, when the disc tray is ejected, the tray cover is pushed out and opened, and the action of closing the tray cover is operatively connected to the action of inserting the disc tray by the engaging unit. In addition, the engaging unit is useful also for preventing the tray cover closing the tray ejecting/inserting opening from being accidentally opened. Therefore, it is not necessary to provide a gear mechanism as disclosed in the patent document 1 described in the beginning. In addition, it is not necessary to use a spring part described in the comparative example, either.

According to the above-embodiments, it is possible to adopt a construction in which the above-mentioned engaging unit is constructed of a protrusion that is formed on the disc tray and a hook that is formed on the tray cover and is engaged with the protrusion when the disc tray is received in the cabinet to thereby prevent the tray cover from being opened and is separated from the protrusion when the disc tray is ejected to thereby be standby at a position where the hook is engaged with the protrusion when the disc tray is inserted. According to this, the engaging unit can be constructed of an extremely simple structure without increasing the number of parts by the protrusion integrated with the disc tray and the hook integrated with the tray cover.

According to the above-embodiments, the tray cover may be mounted in such a way as to be opened and closed around a lateral shaft at the bottom portion of the tray ejecting/inserting opening. According this construction, when the disc tray ejected from the tray ejecting/inserting opening pushes out and opens the try cover, the tray cover is opened around the lateral shaft and is pushed down and retracted. Hence, there is not a possibility that the tray cover is put into contact with a disc placed on the disc tray to damage the disc. In addition, because the tray cover is retracted in a dead space below the disc tray, it is not necessary to separately secure a space where the opened tray cover is received, either.

According to the above-embodiments, the above-mentioned engaging unit may be mounted on two left and right positions. According to this construction, in a case where the tray cover is laterally elongated, it is possible to prevent the one end of the tray cover from being forcibly pulled out in a direction to open by human power and from being warped or twisted.

According to the embodiments, the action of ejecting the disc tray is mechanically connected to the action of opening the tray cover and the action of inserting the disc tray is mechanically connected to the action of closing the tray cover by the engaging unit, and the engaging unit is provided with the function of preventing the tray cover closing the tray ejecting/inserting opening from being accidentally opened. Hence, it is possible to open and close the tray cover and to lock the tray cover at a closing position without using a gear mechanism for controlling the opening and closing of the tray cover and an additional part such as a spring part for holding the tray cover closed. Then, the engaging unit can be constructed of the protrusion integrated with the disc tray and the hook integrated with the tray cover. With this, without increasing the number of parts, it is possible to prevent a trouble that the tray ejecting/inserting opening is accidentally opened to allow a foreign matter to be inserted into the cabinet, a trouble that the inserted foreign matter is left in the cabinet, a trouble that the foreign matter damages a disc or develops a short circuit in electric paths. Therefore, this can make it possible for the user to use the disc device with safety.

What is claimed is:
1. A disc device comprising:
a cabinet having a tray ejection/inserting opening;
a disc tray being ejected from and inserted into the tray ejecting/inserting opening of the cabinet; and
a tray cover being capable of opening and closing the tray ejecting/inserting opening of the cabinet, the tray cover being pushed out and opened from a closing position by the disc tray when the disc tray is ejected, wherein the tray cover is mounted to be opened and closed around a shaft of the widthwise direction of the tray cover at a bottom portion of the tray ejecting/inserting opening formed in a front of the cabinet, wherein the tray has an engaging unit at two substantially-symmetric positions with respect to a center position of the widthwise direction of the tray cover, wherein the engaging unit engages the disc tray with the tray cover at an opening position when the disc tray is inserted to thereby pull in and close the tray cover from an opening position and holds the disc tray and the tray cover engaged with each other when the disc tray is received in the cabinet to thereby prevent the tray cover from being opened, wherein the engaging unit comprises:

a protrusion that is formed on the disc tray; and a hook that is formed on the tray cover and is engaged with the protrusion when the disc tray is received in the cabinet to thereby prevent the tray cover from being opened, and is separated from the protrusion when the disc tray is ejected to thereby be standby at a position where the hook is engaged with the protrusion when the disc tray is inserted.

2. A disc device comprising:

a cabinet having a tray ejection/inserting opening;

a disc tray being ejected from and inserted into the tray ejecting/inserting opening of the cabinet;

a tray cover being capable of opening and closing the tray ejecting/inserting opening of the cabinet, the tray cover being pushed out and opened from a closing position by the disc tray when the disc tray is ejected;

an engaging unit that engages the disc tray with the tray cover at an opening position when the disc tray is inserted to thereby pull in and close the tray cover from the opening position, and holds the disc tray and the tray cover engaged with each other when the disc tray is received in the cabinet to thereby prevent the tray cover from being opened, wherein the engaging unit further comprises:

a protrusion that is formed on the disc tray; and a hook that is formed on the tray cover and is engaged with the protrusion when the disc tray is received in the cabinet to thereby prevent the tray cover from being opened, and is separated from the protrusion when the disc tray is ejected to thereby be standby at a position where the hook is engaged with the protrusion when the disc tray is inserted.

3. A disc device comprising:

a cabinet having a tray ejection/inserting opening;

a disc tray being ejected from and inserted into the tray ejecting/inserting opening of the cabinet;

a tray cover being capable of opening and closing the tray ejecting/inserting opening of the cabinet, the tray cover being pushed out and opened from a closing position by the disc tray when the disc tray is ejected; and an engaging unit that engages the disc tray with the tray cover at an opening position when the disc tray is inserted to thereby pull in and close the tray cover from the opening position, and holds the disc tray and the tray cover engaged with each other when the disc tray is received in the cabinet to thereby prevent the tray cover from being opened, wherein the tray cover is mounted to be opened and closed around a shaft of widthwise direction thereof at a bottom portion of the tray ejecting/inserting opening.

4. A disc device comprising:

a cabinet having a tray ejection/inserting opening;

a disc tray being ejected from and inserted into the tray ejecting/inserting opening of the cabinet;

a tray cover being capable of opening and closing the tray ejecting/inserting opening of the cabinet, the tray cover being pushed out and opened from a closing position by the disc tray when the disc tray is ejected; and an engaging unit that engages the disc tray with the tray cover at an opening position when the disc tray is inserted to thereby pull in and close the tray cover from the opening position, and holds the disc tray and the tray cover engaged with each other when the disc tray is received in the cabinet to thereby prevent the tray cover from being opened, wherein the engaging unit are mounted on two left and right positions.

5. The disc device according to claim 2, wherein the hook is an elastic member.

* * * * *